May 17, 1927.

J. W. PHILLIPS

FOOT ACCELERATOR

Filed Sept. 15, 1926  2 Sheets-Sheet 1

1,628,995

Inventor
J. W. Phillips.

By Lacey & Lacey, Attorneys

May 17, 1927.
J. W. PHILLIPS
1,628,995
FOOT ACCELERATOR
Filed Sept. 15, 1926    2 Sheets-Sheet 2
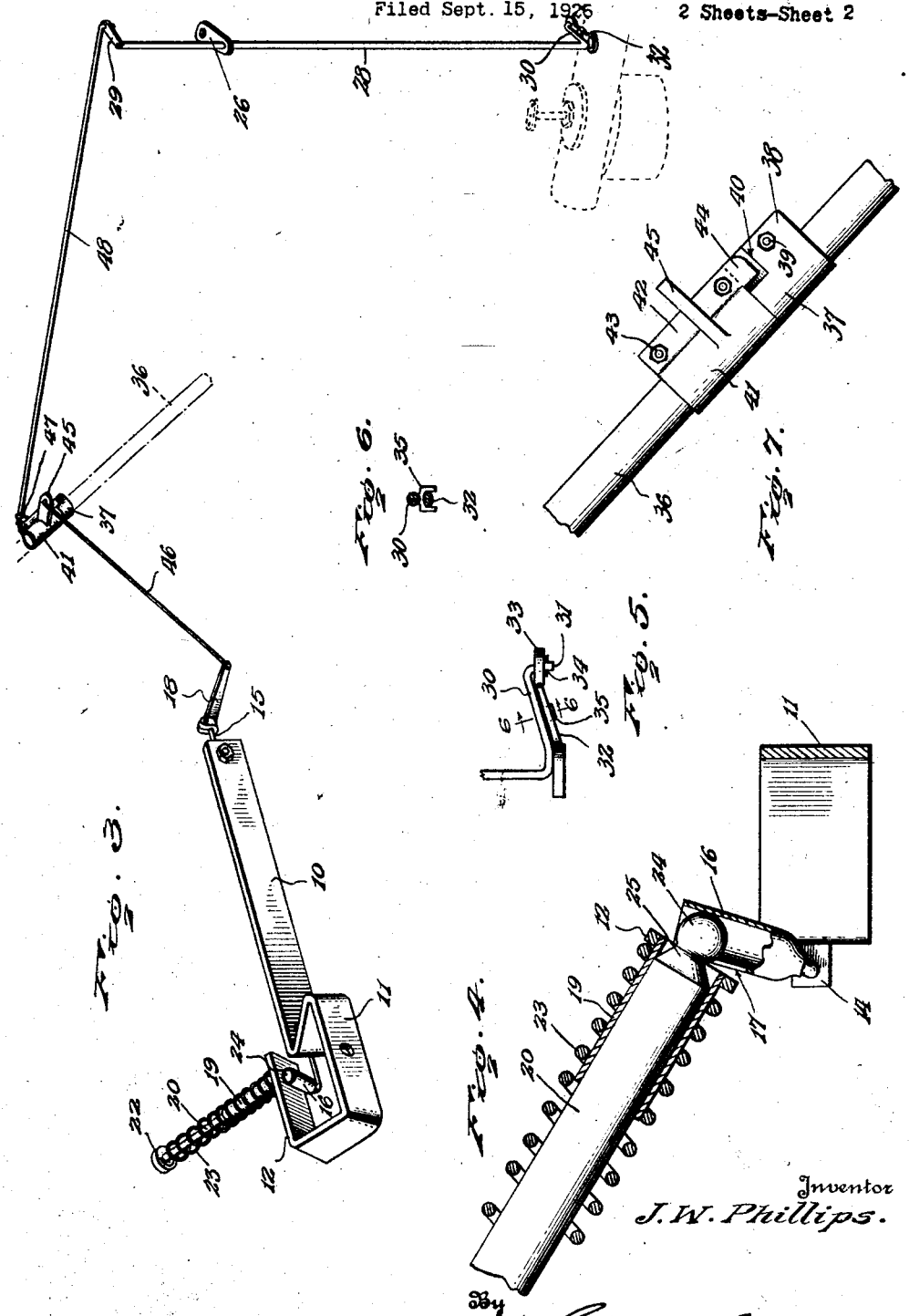
Inventor
J. W. Phillips.
By
Lacey & Lacey, Attorneys Patented May 17, 1927.

1,628,995

UNITED STATES PATENT OFFICE.

JOHN W. PHILLIPS, OF LILLINGTON, NORTH CAROLINA.

FOOT ACCELERATOR.

Application filed September 15, 1926. Serial No. 135,610.

This invention relates to an improved foot accelerator for Ford motor vehicles and seeks, among other objects, to provide a simple and efficient device of this character which may be readily applied to a Ford vehicle without the necessity for any structural change therein, the necessity for drilling any holes in the vehicle, or the necessity for any adjustment in the usual throttle control of the vehicle.

The invention seeks, as a further object, to provide a device which will not interfere with the floor boards of the vehicle, thus permitting the free removal of the floor boards, and wherein the installation of the device will not require cutting or sawing of the floor boards.

And the invention seeks, as a still further object, to provide a device which will function independently of the hand throttle control lever.

Other objects of the invention not specifically mentioned in the foregoing will appear during the course of the following description.

In the accompanying drawings:

Figure 3 is a perspective view particularly showing the links and levers employed.

Figure 4 is an enlarged sectional view showing the foot plunger.

Figure 5 is a detail elevation showing the connection between the vertical rock shaft employed and the throttle lever.

Figure 6 is a transverse sectional view on the line 6—6 of Figure 5, looking in the direction indicated by the arrows.

Figure 7 is a side elevation showing the collars employed upon the usual throttle rod of the vehicle.

Figure 1:
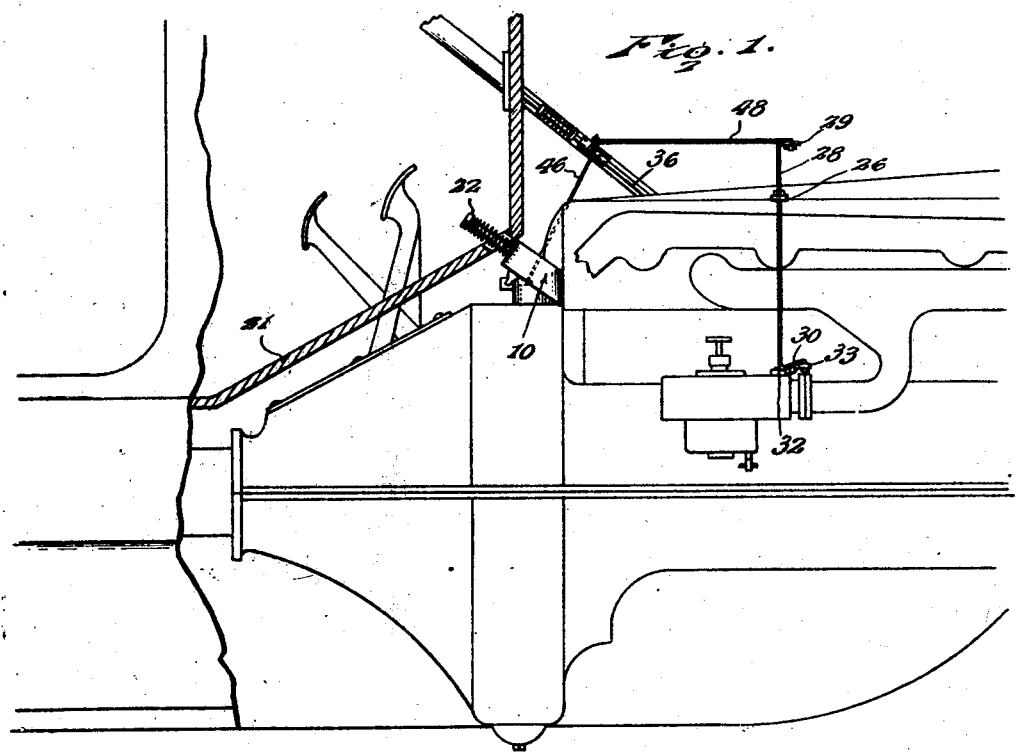
Figure 1 is a side elevation showing my improved device applied to a conventional Ford vehicle.
Figure 2:
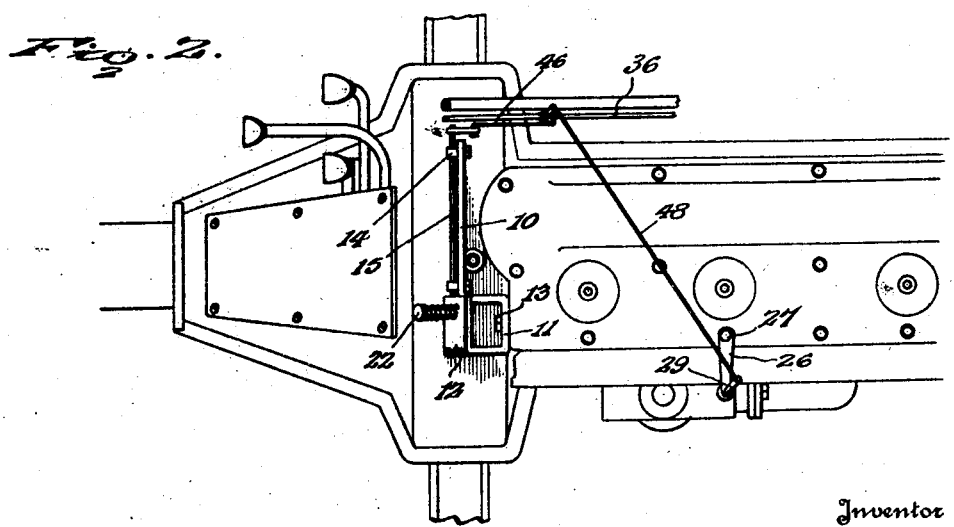
Figure 2 is a top plan view of the device.

In carrying the invention into effect, I employ a bracket 10 which is preferably bent from a metal strip offset near one end thereof to provide a foot 11, and extending rearwardly and upwardly from said foot is an angle-shaped arm 12, the free end of which extends inwardly in a direction over the foot but lies obliquely with respect thereto. Extending through the foot is one of the usual vehicle engine bolts 13 rigidly connecting the bracket with the engine block. In the drawings, I have shown the device applied to a conventional Ford motor vehicle. Bolted to the bracket are longitudinally spaced bearings 14, and journaled through said bearings is a shaft 15 to the inner end of which is fixed, as particularly seen in Figure 4, a tubular lever 16 having a slot 17 in the rear wall thereof, while to the opposite end of said shaft is clamped a lever 18.

Fixed in a suitable opening in the free end of the arm 12 of the bracket is an upwardly and rearwardly inclined sleeve 19, and slidable through said sleeve is a foot plunger 20 which, as seen in Figure 1, projects upwardly through the usual centrally located opening in the uppermost of the floor boards 21 of the vehicle. Integrally formed on or otherwise fixed to the upper end of the plunger is a disc 22, and surrounding the plunger as well as the sleeve 19 to rest at one end against the free end of the arm 12 and at its opposite end against the disc 22, is a spring 23 normally holding the plunger retracted. At its lower end the plunger is formed with a spherical head 24 which fits within the upper end of the tubular lever 16 of the shaft 15, and connecting said head with the plunger is a reduced neck 25 which is freely accommodated through the slot 17 of the lever. Accordingly, as will be seen, when the plunger is depressed the lever 16 will be swung forwardly for rocking the shaft 15.

Mounted upon the engine head is an overhanging arm 26 secured to the head by one of the usual engine head bolts 27, and journaled through said arm is a vertically disposed rock shaft 28 which is provided at its upper end with a lever 29 while at the lower end of the shaft is an oppositely extending lever 30 having a downturned terminal 31. As particularly seen in Figures 3 and 5, the lever 30 rests against the usual throttle lever 32 of the carbureter of the vehicle engine while the terminal 31 of the lever is disposed to extend through the customary eye 33 at the free end of the lever 32, and extending through said terminal is a cotter pin or like device 34 connecting the lever 30 with the lever 32. Formed on or otherwise fixed to the lever 30, as seen in Figures 5 and 6, is an inverted U-shaped clip 35 straddling the lever 32 at a point substantially midway between the ends thereof so that when the shaft 28 is rocked and the lever 30 is swung, the lever 32 will be swung therewith.

Fixed to the usual throttle control rod 36 of the vehicle, as particularly seen in Figures 3 and 7 of the drawings, is a collar 37 having flanges 38, and extending through said flanges is a bolt 39 rigidly connecting the collar with the rod. Formed in the upper end of one of said flanges is a notch 40. Freely surrounding the rod to rest at its lower end against the collar 37 is a somewhat longer collar 41. This collar is preferably formed of mating semi-cylindrical sections having flanges 42, and extending through said flanges are bolts 43 securing the sections of the collar together. At their lower ends, said flanges are extended to form mating portions of a depending ear 44 and, as will be observed, the notch 40 at the upper end of the collar 37 is disposed to receive said ear. Integrally formed on or otherwise attached to one of the sections of the collar 41 is a lever 45, and connecting said lever with the lever 18 of the rock shaft 15 is a rod 46. The other section of the collar 41 is also provided with a lever 47 like the lever 45, and connecting the lever 47 with the lever 29 of the rock shaft 28 is a rod 48. As will now be seen, when the plunger 20 is depressed, the lever 18 will be swung downwardly and the lever 45 pulled rearwardly so that the collar 41 will be rotated in a clockwise direction on the throttle rod 36. Accordingly, the lever 47 will also be swung forwardly and the lever 29 at the upper end of the rock shaft 28 pushed forwardly so that said shaft will be rotated in a clockwise direction, with the result that the lever 30 will be swung for swinging the throttle lever 32 for opening the throttle. Upon release of the plunger 20, the spring 23 will, as previously indicated, retract the plunger with the result that the parts will be returned to their original position and the throttle closed. As will be observed, when the collar 41 is rotated in a clockwise direction for opening the throttle, the ear 44 of said collar will move out of the notch 40 of the collar 37 so that the throttle rod 36 will remain stationary. However, when the throttle rod 36 is manually turned in a clockwise direction, the collar 37 will coact with the ear 44 of the collar 41 for rotating the collar 41 with the throttle rod so that, as will be seen, the shaft 28 will be rocked for swinging the throttle lever 32 and opening the throttle. Rotation of the collar 41 in a clockwise direction by the throttle rod 36, as just previously indicated, will, of course, cause the lever 18 to be swung so that the plunger 20 will be pulled downwardly against the tension of the spring 23. Accordingly, when the throttle rod 36 is counter-rotated, said spring will retract the plunger and swing the lever 18 upwardly for closing the throttle. However, as will be seen, the throttle rod 36 may be manually set for limiting the closing movement of the throttle under the influence of the plunger spring 26.

Having thus described the invention, what I claim is:

1. A device of the character described including a rock shaft adapted for attachment to a throttle, a spring-retracted plunger disposed transversely of the shaft, and a sliding pivotal connection between said plunger and the shaft for rotating the shaft and opening the throttle as the plunger is depressed.

2. A device of the character described including in combination with a manually rotatable control rod, a rock shaft adapted for attachment to a throttle, an element rotatable with the rod for rocking the shaft and opening the throttle, a spring retracted plunger, and a sliding pivotal connection between the plunger and said element for rotating said element independently of the rod and opening the throttle as the plunger is depressed.

3. A device of the character described including a rock shaft adapted for attachment to a throttle, a bracket, a rock shaft carried by the bracket and provided with a tubular lever, an operative connection between said shafts for turning said first mentioned shaft and opening the throttle as the latter shaft is rocked, and a spring retracted plunger having a head freely received in said lever to coact therewith for rocking the latter shaft as the plunger is depressed.

4. The combination with a rock shaft, and a plunger mounted for rectilinear movement, of a tubular lever carried by the shaft, and a head carried by said plunger and having an articulated sliding fit in said lever whereby the plunger may be reciprocated for rocking said shaft.

5. The combination with a rock shaft, and a plunger mounted for rectilinear movement, of a tubular lever carried by the shaft and formed with a slot leading from its free end, and a head carried by said plunger, said head being passed through said slot and having a pivotal sliding fit in said lever whereby the plunger may be reciprocated for rocking said shaft.

6. The combination with a rock shaft, and a plunger mounted for rectilinear movement, of a tubular lever carried by the shaft and provided with a slot, a spherical head carried by the plunger and having an articulated sliding fit in said lever, a reduced neck connecting the head with the plunger and extending freely through said slot, and a spring acting to retract the plunger and normally holding the shaft at the limit of its movement in one direction, the plunger being reciprocable for rocking said shaft.

In testimony whereof I affix my signature.

JOHN W. PHILLIPS [L. S.]